US012162347B2

(12) United States Patent
Markow

(10) Patent No.: US 12,162,347 B2
(45) Date of Patent: Dec. 10, 2024

(54) ELECTRIC DRIVE FOR A VEHICLE

(71) Applicant: ZF Friedrichshafen AG, Friedrichshafen (DE)

(72) Inventor: Alexander Markow, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 62 days.

(21) Appl. No.: 17/904,147

(22) PCT Filed: Feb. 11, 2021

(86) PCT No.: PCT/EP2021/053285
§ 371 (c)(1),
(2) Date: May 10, 2023

(87) PCT Pub. No.: WO2021/160717
PCT Pub. Date: Aug. 19, 2021

(65) Prior Publication Data
US 2023/0271499 A1 Aug. 31, 2023

(30) Foreign Application Priority Data
Feb. 12, 2020 (DE) .................... DE102020201758.1

(51) Int. Cl.
*B60K 25/06* (2006.01)
*B60K 1/00* (2006.01)
(Continued)

(52) U.S. Cl.
CPC .............. *B60K 25/06* (2013.01); *B60K 1/00* (2013.01); *F16H 37/082* (2013.01);
(Continued)

(58) Field of Classification Search
CPC .... B60K 25/06; B60K 1/00; B60K 2001/001; F16H 37/082; F16H 57/037; F16H 57/0436; F16H 2057/02034; F16H 2057/02052
See application file for complete search history.

(56) References Cited

U.S. PATENT DOCUMENTS 3,966,005 A * 6/1976 Binger ................... B62D 11/16
475/24
5,419,406 A * 5/1995 Kawamoto .............. B60K 1/02
475/5
(Continued)

FOREIGN PATENT DOCUMENTS

DE         43 39 672 A1    6/1995
DE    10 2007 033 418 A1   1/2009
(Continued)

OTHER PUBLICATIONS

International Search Report and Written Opinion of the International Search Authority mailed Mar. 26, 2021 in International Application No. PCT/EP2021/053285 (English and German languages) (10 pp.).
(Continued)

*Primary Examiner* — Toan C To
(74) *Attorney, Agent, or Firm* — Crowell & Moring LLP

(57) ABSTRACT

An electric drive for may have at least one electric machine in a housing with a rotor shaft forming the drive shaft, which can be coupled to an intermediate shaft via at least one spur gear, wherein the intermediate shaft is coupled to an output differential for driving output shafts, wherein there is at least one oil pump for pumping transmission fluid, wherein a pump shaft in the oil pump can be driven in the same direction of rotation via a first drive path, which has at least one first freewheel, and via a second drive path, which has at least one second freewheel and at least one differential,
(Continued)

and wherein at least the first freewheel and the second freewheel, as well as the differential, are located radially inside the hollow intermediate shaft.

19 Claims, 4 Drawing Sheets

(51) Int. Cl.
    *F16H 37/08*     (2006.01)
    *F16H 57/037*     (2012.01)
    *F16H 57/04*     (2010.01)
    *F16H 57/02*     (2012.01)

(52) U.S. Cl.
    CPC ....... *F16H 57/037* (2013.01); *F16H 57/0436* (2013.01); *B60K 2001/001* (2013.01); *F16H 2057/02034* (2013.01); *F16H 2057/02052* (2013.01)

(56) References Cited

U.S. PATENT DOCUMENTS

| | | | |
|---|---|---|---|
| 8,348,800 B2* | 1/2013 | Tanaka | B60K 1/00 475/221 |
| 2002/0006009 A1 | 5/2002 | Takenaka et al. | |
| 2003/0078131 A1* | 4/2003 | Nishiji | B60K 17/346 475/221 |
| 2005/0211490 A1 | 9/2005 | Shimizu et al. | |
| 2009/0023529 A1 | 1/2009 | Sanji et al. | |
| 2009/0127954 A1* | 5/2009 | Mogi | F16H 57/0476 310/90 |
| 2011/0207570 A1* | 8/2011 | Tanaka | F16H 37/082 475/150 |
| 2016/0160713 A1* | 6/2016 | Reedy | F16D 13/74 184/6.28 |
| 2017/0174075 A1* | 6/2017 | Hashimoto | B60K 25/06 |
| 2017/0219076 A1* | 8/2017 | Hashimoto | B60K 17/10 |
| 2018/0259007 A1* | 9/2018 | Yamaguchi | F16D 25/14 |
| 2019/0249765 A1 | 8/2019 | Ito et al. | |

FOREIGN PATENT DOCUMENTS

| | | |
|---|---|---|
| DE | 11 2008 000 534 T5 | 12/2009 |
| EP | 1 950 076 A1 | 7/2008 |

OTHER PUBLICATIONS

Office Action dated Nov. 11, 2020 for German Patent Application No. 10 2020 201 758.1 (14 pp.).

* cited by examiner

ELECTRIC DRIVE FOR A VEHICLE

RELATED APPLICATION(S)

This application is a filing under 35 U.S.C. § 371 of International Patent Application PCT/EP2021/053285, filed Feb. 11, 2021, and claiming priority to German Patent Application 10 2020 201 758.1, filed Feb. 12, 2020. All applications listed in this paragraph are hereby incorporated by reference in their entireties.

TECHNICAL FIELD

The present invention relates to an electric drive for a vehicle that has an electric machine in a housing, which has a rotor shaft functioning as a drive shaft coupled to an intermediate shaft via a spur gear, with an output differential for driving the output shafts, in which there is at least one mechanically driven oil pump for the transmission fluid. The present invention also relates to a vehicle that has this electric drive.

BACKGROUND

The electrical components in electric drive housings are cooled with transmission fluid. The transmission fluid is conducted from the oil pan in the housing to these components by a mechanical oil pump. In order to maintain the pumping effect, or flow rate of the mechanical oil pump independently of the direction in which the drive shaft is rotating, the pump shaft in the oil pump must continue to be rotated in the same direction while the drive shaft rotates in different directions. There can be two drive paths for the oil pump for this, which each have a dedicated freewheel, such that the pump shaft will always rotate in the same direction, regardless of the direction in which the drive shaft is rotating.

BRIEF DESCRIPTION OF THE DRAWINGS

Certain aspects of depicted embodiments are explained below with reference to the drawings. Therein.

DETAILED DESCRIPTION

Figure 1:
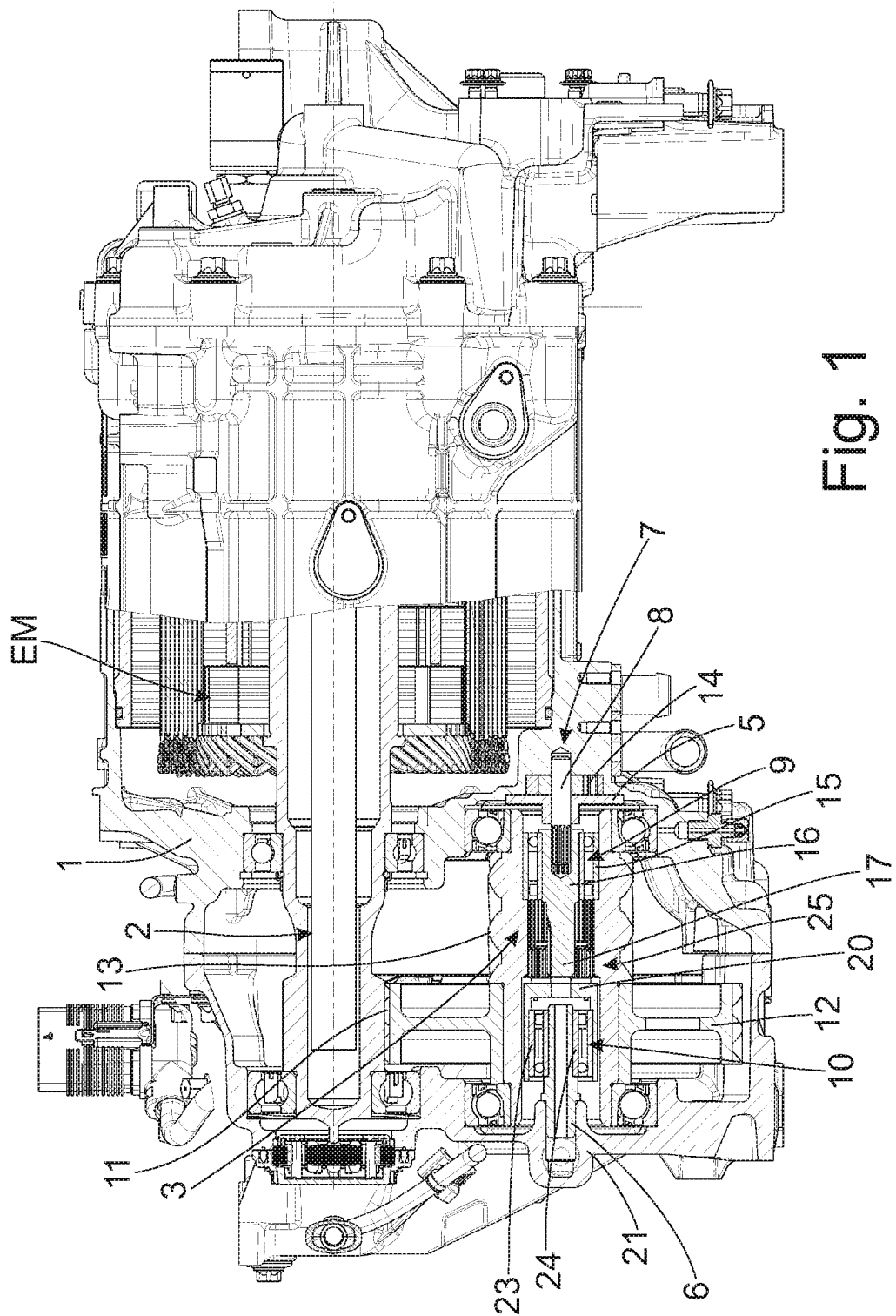
FIG. 1 shows a cutaway illustration of one possible embodiment variation of an electric drive according to the invention for a vehicle, which has a mechanically driven oil pump.
Figure 2:
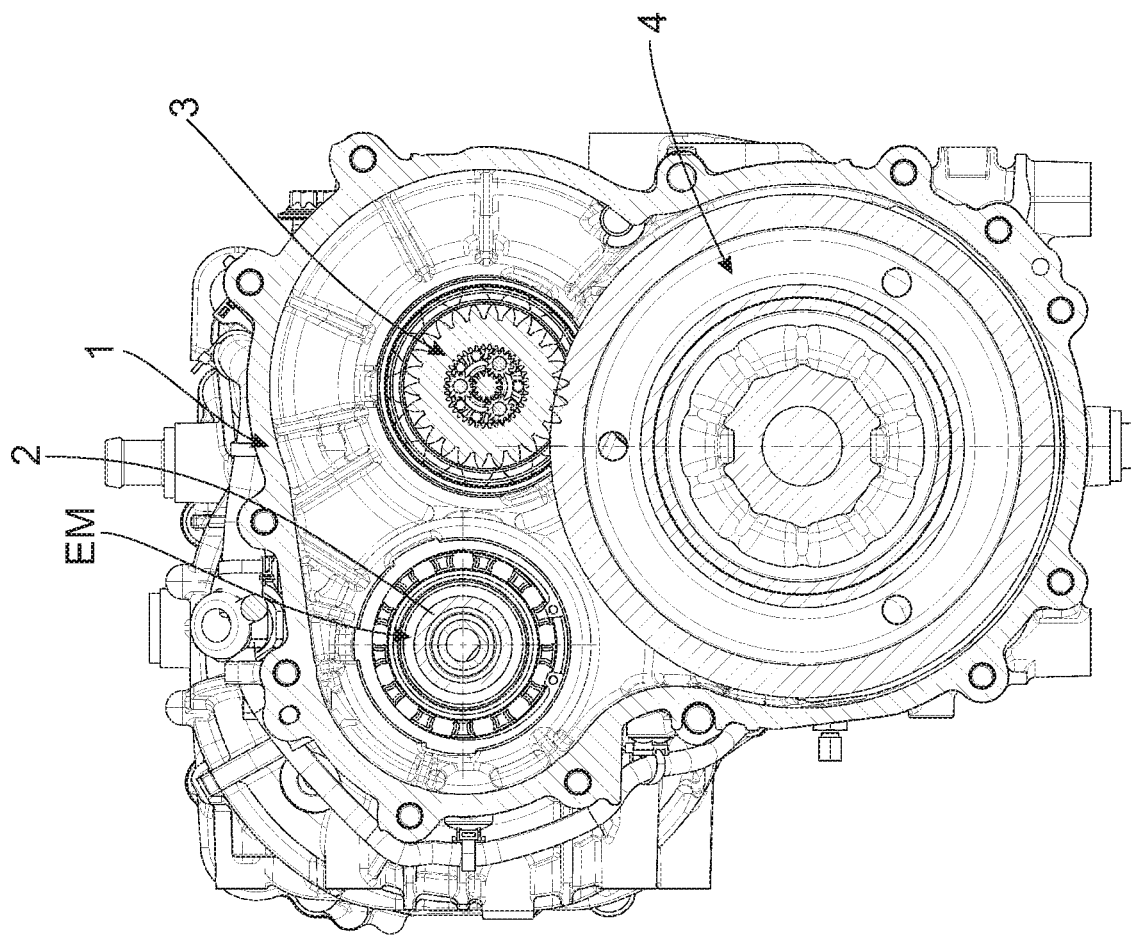
FIG. 2 shows a front cutaway view of the electric drive in a housing.

In view of the background discussed above, an object of the present invention is to create an inexpensive and compact electric drive with a reliable supply of transmission fluid independently of the direction of rotation.

In this regard, an electric drive for a vehicle is proposed that has at least one electric machine in a housing, with a rotor shaft serving as the drive shaft, in which the drive shaft, or rotor shaft, can be coupled to an intermediate shaft via at least one spur gear, and the intermediate shaft is coupled to an output differential for driving the output shafts. There is also at least one mechanical oil pump for the transmission fluid, and the pump shaft in the oil pump can be driven in the same direction with a first drive path that has at least one first freewheel, and with a second drive path that has at least one second freewheel and at least one differential, independently of the direction in which the intermediate shaft is rotating, and the first freewheel and second freewheel, as well as the differential, are placed radially within the hollow intermediate shaft in a space-saving manner.

The integral placement of the components within the intermediate shaft results in both a space-saving assembly, as well as a type of rectifier or rectifying gearing formed by the two drive paths that enables conveyance of transmission fluid from the oil pan in the housing to the components of the electric drive that need to be cooled independently of the direction in which the intermediate shaft is rotating. Other components can also be placed radially within the intermediate shaft in order to further save space.

The differential is preferably comprised of a planetary gearing, resulting in a particularly space-saving assembly. Other differential gearings can also be used as long as the components can be placed radially within the hollow shaft. Mechanical sprag clutches are preferably used for the freewheels, which clamp down in order to transfer torque in one direction of rotation, and rotate freely without transferring torque in the other direction.

In the framework of the present invention, the axes of the drive shaft and intermediate shaft, as well as the output shafts of the output differential, are all parallel within the housing. This results in a space-saving assembly, particularly in the axial direction.

In a particularly simple structural and space-saving design of the present invention the first freewheel is connected to both the pump shaft and the intermediate shaft to obtain the first drive path, and to obtain the second drive path the intermediate shaft is connected to the pump shaft via the differential, and the differential is connected to the housing via the freewheel. The first torque transfer, or first drive path, therefore comprises only the first freewheel, because the intermediate shaft is basically coupled directly to the pump shaft via the first freewheel, thus enabling it to be driven when the first freewheel is locked down. The second torque transfer, or second drive path, is obtained by the second freewheel in conjunction with the differential, or planetary gearing, in that the intermediate shaft is coupled to the pump shaft via two of the elements in the planetary gearing, while a third element of the planetary gearing can be connected to the housing via the second freewheel when the second freewheel is locked down, enabling a torque support against the housing.

In order to ensure that the oil pump is driven when the intermediate shaft rotates in both the first and second directions, the first freewheel and second freewheel function in opposite directions. This means that the one freewheel rotates freely when the other is locked down, and vice versa.

In the structural design of the first drive path in the proposed electric drive, an inner ring in the first freewheel is connected to the pump shaft for conjoint rotation, and an outer ring in the first freewheel is connected to the intermediate shaft for conjoint rotation, such that when the first freewheel is locked down, torque is transferred via the first drive path from the intermediate shaft driven by the drive shaft to the pump shaft via the outer ring and the inner ring of the first freewheel when the intermediate shaft rotates in a first direction.

To simplify the installation of the oil pump in the proposed electric drive, the inner ring of the first freewheel is connected to the pump shaft via a spline gearing or the like, thus having a two-part construction. The inner ring can also exhibit gear teeth, forming a sun gear for the planetary gearing. As a result, the connection of the inner ring to the pump shaft for conjoint rotation can be released as a result of the spline gearing connection, in order to simplify assembly, while the inner ring also forms the sun gear, resulting in both assembly advantages and cost savings.

The second drive path can also have a structurally simple design in the framework of the invention in that an inner ring of the second freewheel is non-rotatably connected to a pin, or the like, fixed in place on the housing, while an outer ring of the second freewheel is connected to a planet carrier in the planetary gearing functioning as the differential for conjoint rotation therewith. As a result, movement of an element in the planetary gearing, specifically the planet carrier, for example, can be blocked, depending on the direction of rotation, in order to obtain torque support against the housing via the freewheel. The planet gears on the planet carrier mesh with a sun gear in the planetary gearing connected to the pump shaft for conjoint rotation, and with a ring gear in the planetary gearing connected to the intermediate shaft for conjoint rotation. Consequently, the other two elements of the planetary gearing, specifically the sun gear and ring gear, by way of example, form a connection between the pump shaft and the intermediate shaft with which torque can be transferred in one direction of rotation for the intermediate shaft. As a result, when the second freewheel is locked down, torque is transferred to the pump shaft from the intermediate shaft driven by the drive shaft over the second drive path, via the ring gear and the planet gears when the movement of the planet carrier is blocked, and via the sun gear.

It is particularly structurally simple and space-saving when the planet carrier is designed as a sleeve or cup in the proposed electric drive, in which the bearing pins of the planet gears are supported on or attached to a front surface thereof. A sleeve or cup-shaped planet carrier can be coaxial to the second freewheel, and the second freewheel can be accommodated radially within the sleeve or cup-shaped planet carrier in a space-saving manner.

Another structurally simple and inexpensive design is obtained with the proposed electric drive in that the hollow intermediate shaft has gear teeth on its inner circumference, thus forming a ring gear. In this manner, the ring gear is basically formed by the inside of the intermediate shaft, such that it is an integral part of the intermediate shaft, for example.

Optimal operation of the electric drive with a sufficient supply of transmission fluid is obtained in that the first direction of rotation for the intermediate shaft corresponds to forward travel for the electric drive, and the second direction of rotation for the intermediate shaft corresponds to travel in reverse. Despite different rotational rates, because the rotational rate in the second direction, for reverse travel, is substantially lower than the rotational rate in the first direction, for forward travel, the same cooling performance, or pump output, is obtained in the reverse direction that is obtained in the forward direction in the drive according to the invention through the use of the planetary gearing, due to the gear ratio of the planetary gearing.

Another aspect of the present invention is a vehicle that has the electric drive described above. This also has the advantages described above. In a particularly advantageous embodiment, the electric drive is used as the axle drive for the vehicle.

Various views of an electric drive according to the invention for a vehicle are shown by way of example in FIGS. 1 to 4. The electric drive comprises an electric machine EM in a housing 1, in which a rotor shaft functioning as the drive shaft 2 is coupled to an intermediate shaft 3 via a spur gear or spur gear stage, and the intermediate shaft 3 is coupled to an output differential 4 for driving the output shafts.

The electric drive has a mechanically driven oil pump 7 for supplying transmission fluid to the housing 1. A pump shaft 8 in the oil pump 7 can be rotated in the same direction via at least one first drive path that has at least one first freewheel 9 and via a second drive path that has at least one second freewheel 10 and via at least one differential 25, independently of the direction in which the intermediate shaft 3 is rotating.

Figure 3:
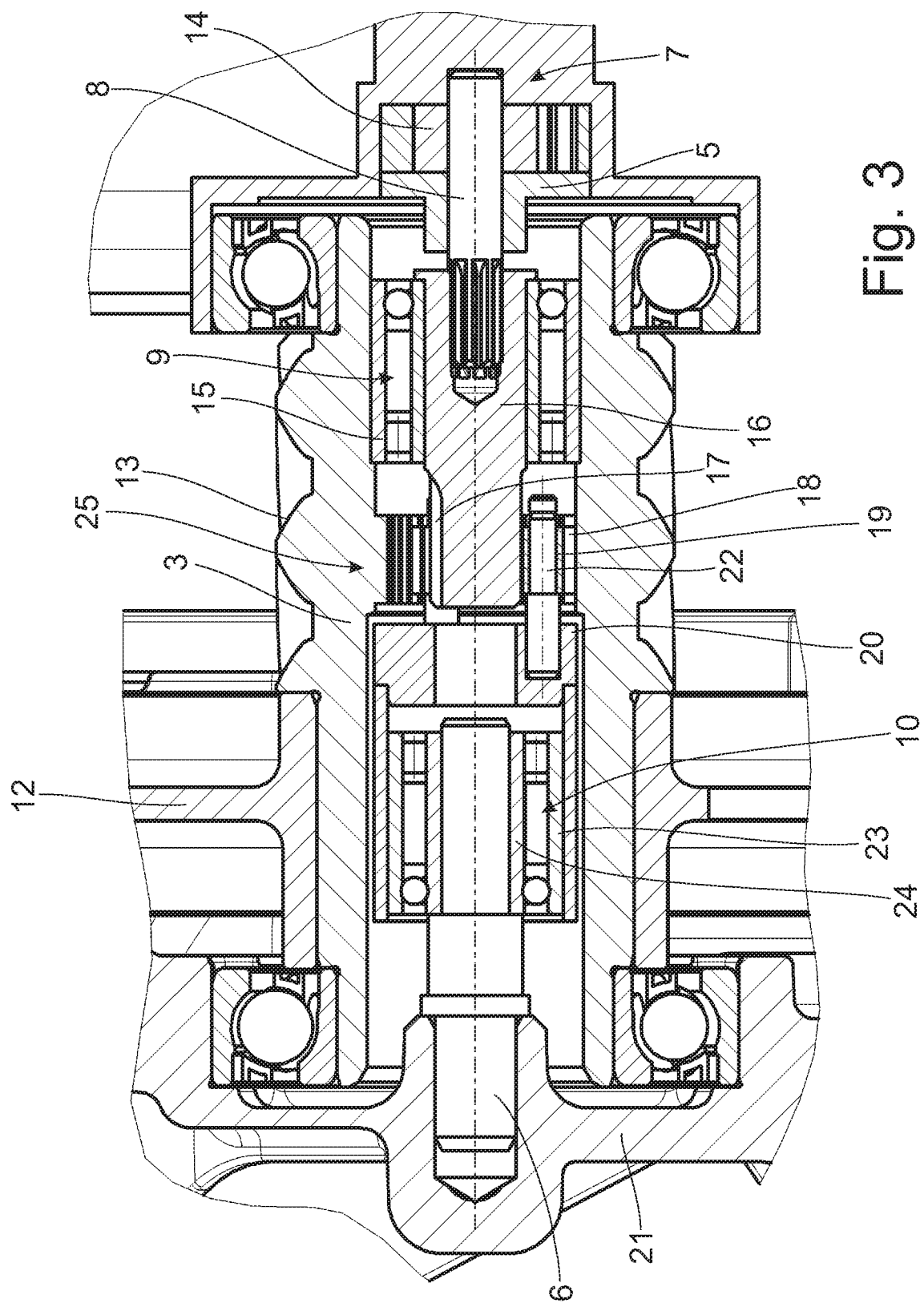
FIG. 3 shows a cutaway detailed view of an intermediate shaft in the electric drive.
Figure 4:
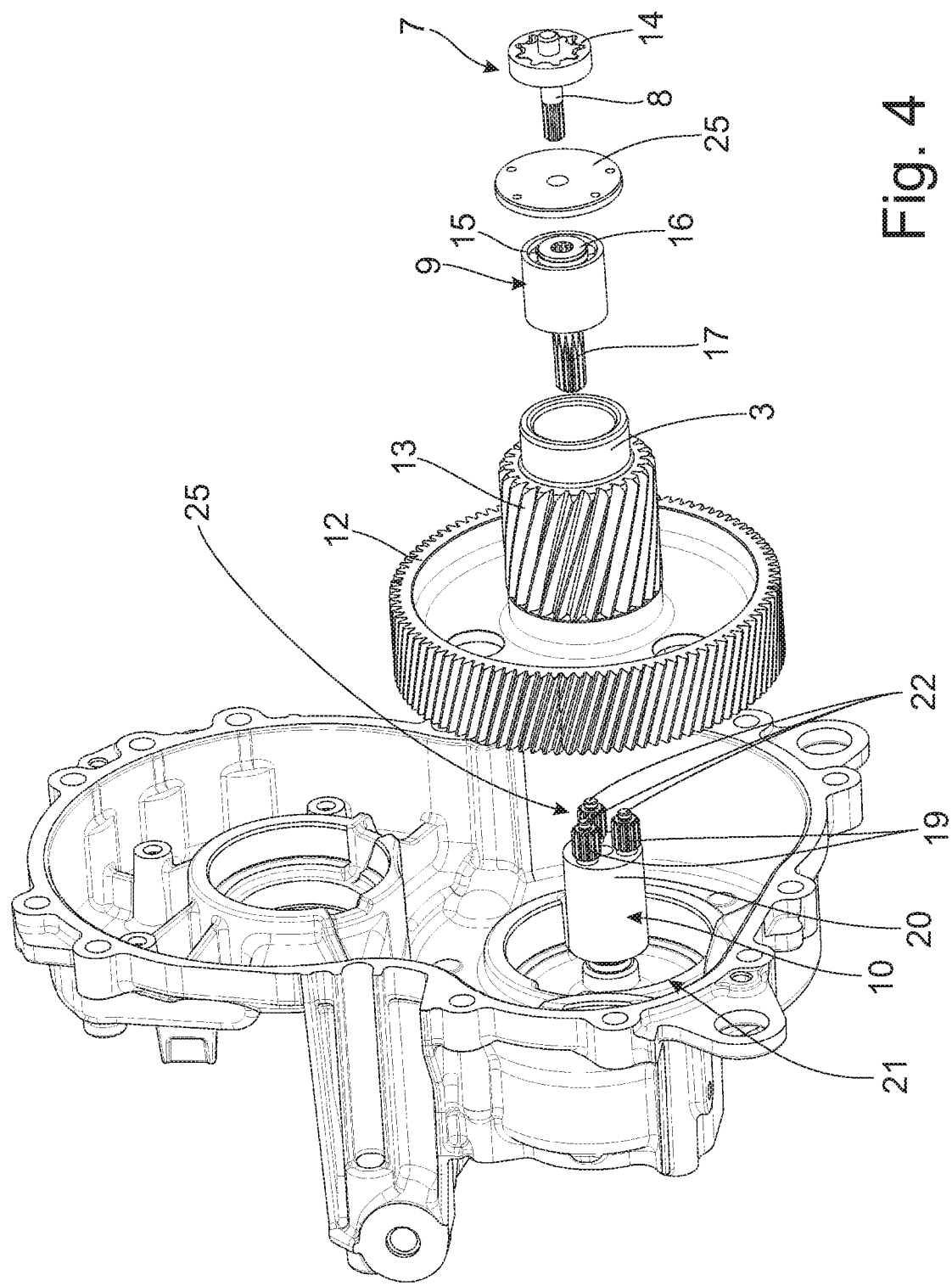
FIG. 4 shows an exploded view of the oil pump and the intermediate shaft in the electric drive.

As can be seen in particular in FIGS. 1, 3 and 4, the first freewheel 9 and second freewheel 10, as well as the differential 25, are located radially inside the hollow intermediate shaft 3, in order to obtain a particularly space-saving assembly.

The mechanically driven oil pump 7 in the electric drive according to the invention is driven via the two freewheels 9, 10 and the differential, basically via a rectifying gearing, in order to convey the transmission fluid from a pan in the housing 1 to the preferably electric components of the electric drive that need to be cooled, while the direction of rotation of the intermediate shaft 3, or the electric machine EM, has no effect on the operation of the oil pump 7.

The oil pump 7 is coaxial to the intermediate shaft 3, and the elements that drive the pump, e.g. the gear wheels and freewheels 9, 10, along with the differential 25 in the form of a planetary gearing, are located radially inside the intermediate shaft 3. The proposed electric drive is preferably an electric drive axle or axle drive, and the electric machine EM is placed such that the axis of its rotor shaft functioning as the drive shaft 2 is parallel to the axis of the intermediate shaft 3 and to the axes of the output shafts of the output differential 4, as can be seen in particular in FIG. 2. In this design, shown by way of example, a particularly small installation space is required in the axial direction as a result of the proposed assembly within the intermediate shaft 3.

The drive shaft 2 for the electric machine EM is connected via the intermediate shaft 3 to the output differential 4 via a single-stage spur gear. A spur gear 11 is located on the drive shaft 2 for this, which engages with another spur gear 12 on the intermediate shaft 3. The spur gear 3 has gear teeth 13 on its outer circumference, which engage with a differential cage in the output differential 4.

The mechanically driven oil pump 7 is coaxial to the intermediate shaft 3, and the pump gearset 14 is located on the pump shaft 8 for the oil pump 7 such that the oil pump 7 is driven by the rotation of the intermediate shaft 3.

The transfer of torque from the intermediate shaft 3 to the pump shaft 8 for the oil pump 7 takes place via either the first drive path or the second drive path, depending on the direction in which the intermediate shaft 3 is rotating. The torque can be transferred via the first drive path with the first freewheel 9, or via the second drive path with the second freewheel 10 and the planetary gearing functioning as a differential 25.

The structural design and placement of the two drive paths radially inside the intermediate shaft 3 can be seen in particular in FIGS. 3 and 4.

The first drive path comprises the first freewheel 9, in which an outer ring 15 of the first freewheel 9 is located on an inner circumferential surface of the intermediate shaft 3. An inner ring 16 of the first freewheel 9 rests on the pump shaft 8. Sprags are located therebetween, in order to transfer torque when the first freewheel 9 is locked down in a first direction of rotation, which corresponds to forward travel. In the opposite direction of rotation, the sprags do not bind, such that the first freewheel 9 does not transfer any torque.

The second drive path contains the planetary gearing and the second freewheel 10, in which a sun gear 17 in the planetary gearing is directly or indirectly connected to the pump shaft 8 for conjoint rotation. A ring gear 18 in the planetary gearing is formed by the inner surface of the hollow intermediate shaft 3 in that there are gear teeth on the internal circumference of the intermediate shaft. The ring gear is therefore connected to the intermediate shaft 3 for conjoint rotation. The ring gear 18 and sun gear 17 are connected to or engage with one another such that a torque can be transferred. The planet gears 19 are supported on the planet carrier 20. The planet carrier 20 is pressed into, or supported on a pin 6 in the housing of the electric drive, in a lid or bearing plate 21 on the housing 1, over the second freewheel 10. The planet gears 19 are supported at their bearing bolts 22 via the planet carrier 20, and the planet carrier 20 is in the form of a sleeve or cup. The planet carrier 20 is connected to an outer ring 23 of the second freewheel 10. The inner ring 24 of the second freewheel 10 rests on the pin 6 in the housing, which is connected to the lid or bearing plate 21.

During forward travel, torque is transferred from the electric machine EM to the intermediate shaft 3 via the spur gear. The intermediate shaft 3 rotates in a first direction. The torque is transferred via the first drive path from the outer ring 15 of the first freewheel 9 via the sprags to the inner ring 16 in the first freewheel 9, which is connected to the pump shaft 8 for conjoint rotation. The pump shaft 8 drives the pump rotor for the oil pump 7. When the intermediate shaft 3 rotates in the first direction, no torque is transferred via the second drive path, because the direction of rotation of the ring gear 18 in the planetary gearing is transferred to the planet gears 19, but the second freewheel 10 is open and rotates freely with the planet carrier 20, such that the sun gear 17 in the planetary gearing does not rotate, and does not cause the pump shaft to rotate 8.

When traveling in reverse, the intermediate shaft 3 rotates in the other direction, in which the first freewheel 9 is open, i.e. not locked down, such that the no torque can be transferred via the first freewheel 9. In this case, the torque is transferred via the second drive path. The drive torque is then transferred via the inner surface of the intermediate shaft 3, i.e. the ring gear 18 of the planetary gearing, to the planet gears 19, because the intermediate shaft 3 is moving in the second direction. The second freewheel 10 is locked down, and the movement of the planet carrier 20 is blocked. The planet gears 19 therefore rotate about their axes, thus driving the sun gear 14. The sun gear 14 is driven in the opposite direction as the intermediate shaft 3, such that the pump shaft 8 for the oil pump 7 is again driven in the same direction.

REFERENCE SYMBOLS

1 housing
2 drive shaft or rotor shaft for the electric machine
3 intermediate shaft
4 output differential
5 pump lid
6 housing pin
7 mechanically driven oil pump
8 pump shaft for the oil pump
9 first freewheel
10 second freewheel
11 spur gear for the rotor shaft or drive shaft
12 spur gear for the intermediate shaft
13 gear teeth on the intermediate shaft
14 pump gear set for the oil pump
15 outer ring for the first freewheel
16 inner ring for the first freewheel
17 sun gear in the planetary gearing
18 ring gear in the planetary gearing
19 planet gears
20 planet carrier for the planetary gearing
21 lid or bearing plate on the housing
22 bearing pin for the planetary gears
23 outer ring for the second freewheel
24 inner ring for the second freewheel
25 differential
EM electric machine

The invention claimed is:

1. An electric drive for a vehicle, the electric drive comprising:
    a housing;
    a rotor shaft functioning as a drive shaft configured for coupling to an intermediate shaft via at least one spur gear; and
    at least one oil pump for pumping transmission fluid,
    wherein the intermediate shaft is coupled to an output differential for driving output shafts,
    wherein a pump shaft in the oil pump rotates in a first direction that is independently of a direction in which the intermediate shaft rotates,
    wherein the pump shaft is rotatable via a first drive path, which has at least one first freewheel, and via a second drive path, which has at least one second freewheel is configured to be driven with at least one differential, and
    wherein the first freewheel, the second freewheel, and the differential are located radially inside the intermediate shaft.

2. The electric drive according to claim 1, wherein a planetary gearing forms the differential.

3. The electric drive according to claim 1, wherein the axes of drive shaft and the intermediate shaft, as well as the output shafts, are parallel to one another.

4. The electric drive according to claim 1, wherein the first drive path is obtained when the first freewheel is attached to the pump shaft and the intermediate shaft, and that the second drive path is obtained when the intermediate shaft is attached to the pump shaft via the differential and the differential is attached to the housing via the second freewheel.

5. The electric drive according to claim 1, wherein an inner ring in the first freewheel is connected to the pump shaft for conjoint rotation, and an outer ring in the first freewheel is connected to the intermediate shaft for conjoint rotation, such that a torque can be transferred to the pump shaft from the intermediate shaft driven by the drive shaft via the first drive path, when the intermediate shaft rotates in a first direction and the first freewheel is locked down, via the outer ring and inner ring of the first freewheel.

6. The electric drive according to claim 5, wherein the inner ring in the first freewheel is connected to the pump shaft for conjoint rotation via a spline gearing, and the inner ring has gear teeth to form a sun gear of the planetary gearing.

7. The electric drive according to claim 1, wherein an inner ring of the second freewheel is non-rotatably connected to a pin fixed in place in the housing, and an outer ring in the freewheel is connected to a planet carrier in the planetary gearing for conjoint rotation, wherein the planet gears on the planet carrier mesh with a sun gear in the planetary gearing connected to the pump shaft for conjoint rotation, and with a ring gear in the planetary gearing connected to the intermediate shaft for conjoint rotation, such that torque can be transferred to the pump shaft from the intermediate shaft driven by the drive shaft via the second drive path when the intermediate shaft is rotating in the other direction and the second freewheel is locked down, via the ring gear and the planet gears when the movement of the planet carrier is blocked, and via the sun gear.

8. The electric drive according to claim 7, wherein the planet carrier includes at least one of a sleeve and a cup, and wherein a plurality of bearing pins of the planet gears are attached to a front surface of the at least one of the sleeve and the cup.

9. The electric drive according to claim 7, wherein the planet carrier is coaxial relative to the second freewheel, and wherein the second freewheel is received radially inside the planet carrier.

10. The electric drive according to claim 7, wherein the intermediate shaft is at least partially hollow and has gear teeth on its inner circumference, thus forming the ring gear for the planetary gearing.

11. The electric drive according to claim 1, wherein the first direction of rotation for the intermediate shaft is assigned to forward travel, and a second direction of rotation for the intermediate shaft is assigned to travel in reverse.

12. The electric drive according to claim 1, wherein the first freewheel and second freewheel rotate in opposite directions.

13. A vehicle with an electric drive according to claim 1.

14. The vehicle according to claim 13, wherein the electric drive forms an axle drive.

15. The electric drive according to claim 1, further comprising at least one electric machine for powering the electric drive.

16. The electric drive according to claim 15, wherein the electric machine is at least partially located in the housing.

17. An electric drive for a vehicle, the electric drive comprising:
a rotor shaft functioning as a drive shaft configured for coupling to an intermediate shaft via at least one spur gear; and
at least one oil pump for pumping transmission fluid,
wherein the intermediate shaft is coupled to an output differential for driving output shafts,
wherein a pump shaft in the oil pump is rotatable independently relative to rotation of the intermediate shaft,
wherein the pump shaft is rotatable via a first drive path, which has at least one first freewheel, and via a second drive path, which has at least one second freewheel is configured to be driven with at least one differential, and
wherein the first freewheel, the second freewheel, and the differential are located radially inside the intermediate shaft.

18. The electric drive according to claim 17, wherein a planetary gearing forms the differential.

19. The electric drive according to claim 17, wherein the axes of drive shaft and the intermediate shaft, as well as the output shafts, are parallel to one another.

* * * * *